US009857271B2

(12) United States Patent
Dashevskiy et al.

(10) Patent No.: US 9,857,271 B2
(45) Date of Patent: Jan. 2, 2018

(54) LIFE-TIME MANAGEMENT OF DOWNHOLE TOOLS AND COMPONENTS

(71) Applicant: Baker Hughes Incorporated, Houston, TX (US)

(72) Inventors: Dmitriy Dashevskiy, Nienhagen (DE); John D. MacPherson, Spring, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 643 days.

(21) Appl. No.: 14/051,353

(22) Filed: Oct. 10, 2013

(65) Prior Publication Data

US 2015/0106015 A1    Apr. 16, 2015

(51) Int. Cl.
| E21B 49/00 | (2006.01) |
| G01M 13/00 | (2006.01) |
| E21B 41/00 | (2006.01) |

(52) U.S. Cl.
CPC ............ *G01M 13/00* (2013.01); *E21B 41/00* (2013.01); *E21B 2041/0028* (2013.01)

(58) Field of Classification Search
USPC .......................................................... 702/6
See application file for complete search history.

(56) References Cited

U.S. PATENT DOCUMENTS

| 4,912,647 A | 3/1990 | Wood |
| 5,202,680 A | 4/1993 | Savage |
| 6,732,052 B2 | 5/2004 | MacDonald et al. |
| 7,020,569 B2 | 3/2006 | Cao et al. |
| 7,357,197 B2 | 4/2008 | Schultz et al. |
| 7,762,131 B2 | 7/2010 | Ibrahim et al. |
| 7,921,937 B2 | 4/2011 | Brackin et al. |

(Continued)

FOREIGN PATENT DOCUMENTS

| EP | 1193366 A2 | 4/2002 |
| WO | 03089759 A1 | 10/2003 |

(Continued)

OTHER PUBLICATIONS

Oilfield Review, Testing the Limits in Extreme Well Conditions, Oilfield Review Autumn 2012: 24, No. 3. Copyright © 2012 Schlumberger, pp. 4-19.*

(Continued)

*Primary Examiner* — Tung Lau
(74) *Attorney, Agent, or Firm* — Mossman, Kumar & Tyler, PC

(57) ABSTRACT

Systems, methods and devices for evaluating a condition of a downhole component of a drillstring. Methods include estimating a value of a tool parameter of the component at at least one selected position on the drillstring; and using the estimated value to evaluate the condition of the downhole component. The estimating is done using a trained artificial neural network that receives information from at least one sensor that is positionally offset from the selected position. The method may further include creating a record representing information from estimated values of the tool parameter at the at least one selected position over time. The at least one selected position may include a plurality of positions, such as positions at intervals along the component, including substantially continuously along the component.

19 Claims, 8 Drawing Sheets

(56) References Cited

U.S. PATENT DOCUMENTS

| | | | |
|---|---|---|---|
| 7,930,259 | B2 | 4/2011 | Hashimoto et al. |
| 2002/0120401 | A1* | 8/2002 | Macdonald ............ E21B 44/005 702/6 |
| 2007/0067678 | A1 | 3/2007 | Hosek et al. |
| 2007/0284147 | A1* | 12/2007 | Moran .................... E21B 44/00 175/24 |
| 2009/0011445 | A1 | 1/2009 | Hoon et al. |
| 2009/0114445 | A1 | 5/2009 | Dashevskiy |
| 2009/0240366 | A1 | 9/2009 | Kaushal et al. |
| 2009/0299654 | A1 | 12/2009 | Garvey et al. |
| 2010/0032165 | A1 | 2/2010 | Bailey et al. |
| 2010/0042327 | A1 | 2/2010 | Garvey et al. |
| 2012/0316787 | A1 | 12/2012 | Moran et al. |

FOREIGN PATENT DOCUMENTS

| | | |
|---|---|---|
| WO | 2004090285 A1 | 10/2004 |
| WO | 2009132281 A1 | 10/2009 |
| WO | 2012009804 A1 | 1/2012 |

OTHER PUBLICATIONS

Dashevskiy D., Real-Time Drilling Optimization Based on MWD Dynamic Measurements—Field Test Results, Houston, Texas, Apr. 1-3, 2003, 10 pages.*

Buban Song, Failure Analysis on Dievelopment Drilling Rigs, CEED Seminar Proceedings 2012, 6 pages.*

Venkatasubramanian, Venkat et al., "A review of process fault detection and diagnosis Part III: Process history based methods," Computers & Chem. Engrng 27, pp. 327-346 (2003).

Aggrey, G.H. et al., "Tracking the State and Diagnosing Downhole Permanent Sensors in Intelligent-Well Completions With Artificial Neural Network," SPE107198, Society of Petroleum Engineers, (Sep. 2007).

Yacout, Soumaya, "Fault Detection and Diagnosis for Condition Based Maintenance Using the Logical Analysis of Data," Dept. of Mathematics & Industrial Engrng, Ecole Polytechnique (2010).

EP Application 14852279.0—European Search Report dated Jun. 21, 2017.

Int'l Search Report and Written Opinion in PCT/US2014/059697 dated Mar. 18, 2015.

* cited by examiner

| Component X | Component X | Component X | Component X | Component Type Y | Component Type Y | |
|---|---|---|---|---|---|---|
| | Start | End | Start | End | | |
| Time in Use | $t_{11}$ | $t_{12}$ | $t_{21}$ | $t_{22}$ | ⋮ | |
| With Temperature Threshold Exceeded | $T_{11}$ | $T_{12}$ | $T_{21}$ | $T_{22}$ | ⋮ | |
| With Axial Vibration Threshold 1 Exceeded | $V_{11}$ | $V_{12}$ | $V_{21}$ | $V_{22}$ | ⋮ | |
| With Axial Vibration Threshold 2 Exceeded | $V2_{11}$ | $V2_{12}$ | $V2_{21}$ | $V2_{22}$ | ⋮ | |
| ⋮ | | | | | ⋮ | |

| Component Type Y | | | | | |
|---|---|---|---|---|---|
| Cumulative Time(s) with: | ///// | ///// | ///// | ///// | ///// |
| Temperature Threshold Exceeded | 0-3600 | ... | 8000-12000 | ... | >1000000 |
| Axial Vibration Threshold 1 Exceeded | 0-4800 | ... | 16000-32000 | ... | >2000000 |
| Axial Vibration Threshold 2 Exceeded | 0-1600 | ... | 0-1600 | ... | >1000000 |
| ... | ... | ... | ... | ... | ... |
| Condition | Like new | ... | Heavy Normal Use | ... | Failure Imminent |
| Action | No Action | ... | Inspect | ... | Remove from Use |

| Component X | Component Type Y | |
|---|---|---|
| | Measurements | Values |
| Cumulative - Pos 1 | $X_1$ | $X_2$ |
| ⋮ | ⋮ | ⋮ |
| Cumulative Temp - Pos 68 | $X_{135}$ | $X_{136}$ |
| ⋮ | ⋮ | ⋮ |
| Cumulative Bending Moment - Pos 272 | $X_{1243}$ | $X_{1244}$ |
| ⋮ | ⋮ | ⋮ |
| Cumulative Axial Vibration - Pos 17 | $X_{1753}$ | $X_{1754}$ |
| ⋮ | ⋮ | ⋮ |

| Component X | Component Type Y |
|---|---|
| Moving Avg. Temp- Pos 1 | $X_1$ |
| ⋮ | ⋮ |
| Cyclical Stress Parameter - Pos 184 | $X_{1371}$ |
| ⋮ | ⋮ |

FIG. 7D

LIFE-TIME MANAGEMENT OF DOWNHOLE TOOLS AND COMPONENTS

FIELD OF THE DISCLOSURE

In one aspect, this disclosure relates generally to drilling a borehole in an earth formation. More particularly, this disclosure relates to methods, devices, and systems for evaluating a condition of a component of a drillstring.

BACKGROUND OF THE DISCLOSURE

Geologic formations are used for many purposes such as hydrocarbon production, geothermal production and carbon dioxide sequestration. Boreholes are typically drilled into an earth formation in order to intersect and/or access the formation. Various types of drillstrings may be deployed in a borehole. A drillstring generally includes components, such as those making up a drill pipe or a bottomhole assembly. The bottomhole assembly contains drill collars which may be instrumented and can be used to obtain measurements-while-drilling or -while-logging. The drill pipe may likewise be instrumented with measurement devices (referred to as distributed sensors) and can be used to obtain along-string-measurements. Wear or damage to the components may occur through regular exposure to downhole conditions. In particular, material fatigue of components may occur due to cyclic loading of components or other downhole conditions. While deployed in the borehole, the components of the drillstring may be subject to vibrations, elevated temperatures, and a variety of forces or strains which compound material fatigue.

SUMMARY OF THE DISCLOSURE

In aspects, the present disclosure is related to evaluation of a condition of a downhole component of a drillstring in a borehole intersecting an earth formation.

General embodiments may include methods for evaluating a condition of a downhole component of a drillstring. Methods may include estimating a value of a tool parameter of the component at at least one selected position on the drillstring, wherein the estimating is done using a trained artificial neural network that receives information from at least one sensor that is positionally offset from the selected position; and using the estimated value to evaluate the condition of the downhole component. Methods may include creating a record representing information from estimated values of the tool parameter at the at least one selected position over time. Methods may include making a component life management decision about the component using the condition.

The at least one selected position may be a plurality of positions, which may include a plurality of positions at intervals along the component. The plurality of positions may include a plurality of positions substantially continuously along the component. The at least one sensor may be positionally offset from the selected position by at least half of the axial length of the component. The information received from the at least one sensor may be at least one other value of the tool parameter measured at the at least one sensor. The tool parameter may include a characteristic of a state of a downhole component as it is being used in drilling operations downhole. The tool parameter may include at least one parameter selected from the group comprising: i) a vibration parameter; and ii) a temperature parameter. The condition may be at least one of: i) material fatigue of the component; and ii) estimated remaining useful life of the component.

Other embodiments include systems for evaluating a condition of a downhole component of a drillstring in a borehole using at least one sensor on the drillstring. A system may include at least one processor configured to: estimate a value of a tool parameter of the component at at least one selected position on the drillstring, wherein the estimating is done using a trained artificial neural network that receives information from at least one sensor that is positionally offset from the selected position; and evaluate the condition of the downhole component using the estimated value. The system may include a drillstring configured to be conveyed into a borehole, the drillstring comprising the downhole component. The system may include a computer memory accessible to the at least one processor, wherein the at least one processor is further configured to create a record in the computer memory representing estimated values of the tool parameter at the at least one selected position over time.

Other embodiments according to the present disclosure include non-transitory computer-readable medium products having instructions thereon that, when read by at least one processor, causes the at least one processor to execute a method disclosed herein. Example embodiments may include non-transitory computer-readable medium product for evaluating a condition of a downhole component of a drillstring, the product accessible to at least one processor, the computer readable medium including instructions that enable the at least one processor to: estimate a value of a tool parameter of the component at at least one selected position on the drillstring, wherein the estimating is done using a trained artificial neural network that receives information from at least one sensor that is positionally offset from the selected position; and evaluate the condition of the downhole component using the estimated value.

Examples of features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIG. 7A illustrates an example record in accordance with embodiments of the present disclosure.

FIG. 7B illustrates a component life database for evaluating conditions and providing a lifetime management action for the condition in accordance with embodiments of the present disclosure.

FIGS. 7C & 7D illustrate further example records in accordance with embodiments of the present disclosure.

DETAILED DESCRIPTION

Figure 1:
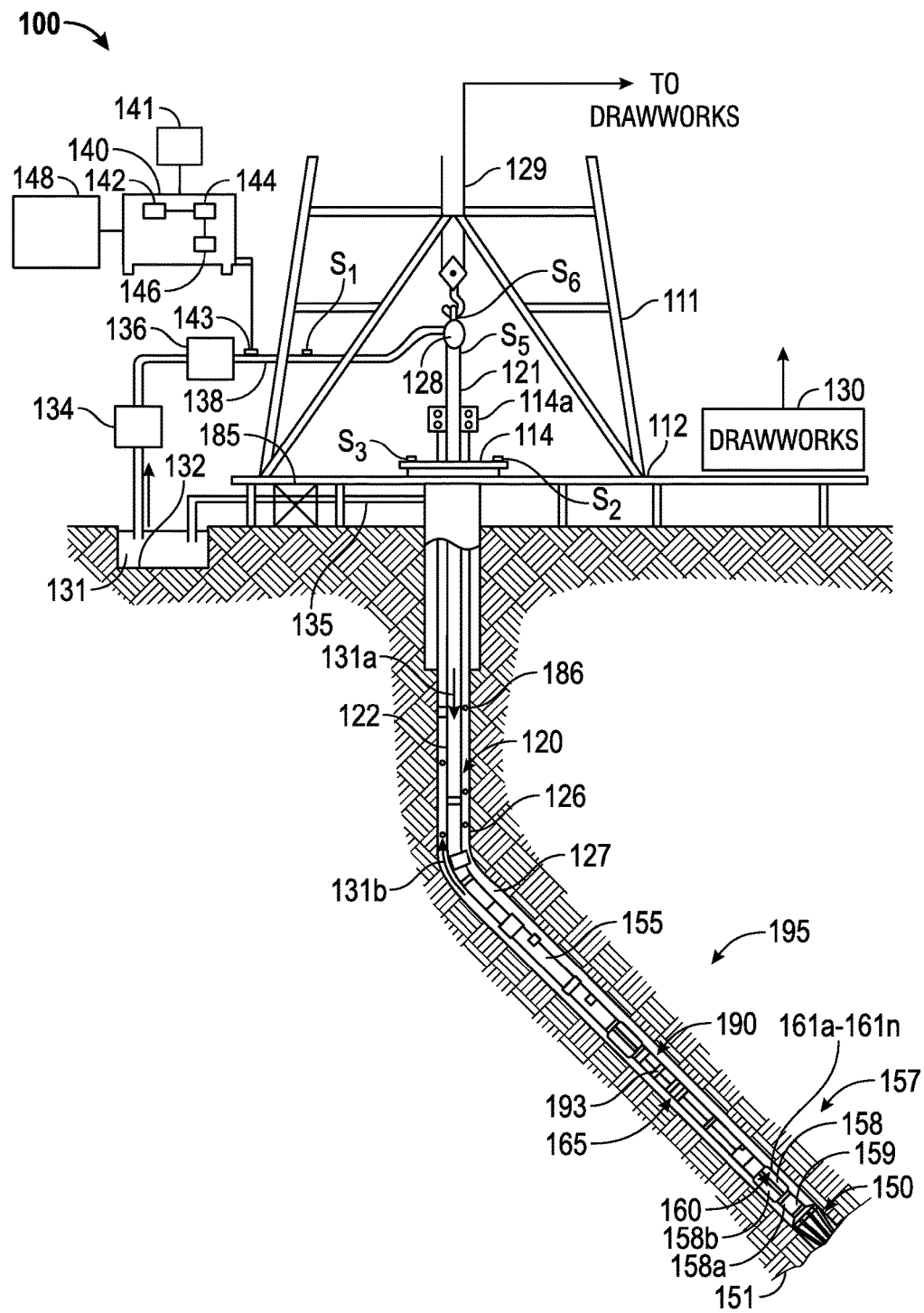
FIG. 1 shows a schematic diagram of an example drilling system in accordance with embodiments of the present disclosure for evaluating a condition of a component of a drillstring.

In aspects, the present disclosure is related to evaluation of a condition of a component of a drillstring. The drillstring component may be downhole, i.e., in a borehole intersecting an earth formation. The present disclosure may be related to estimating a value of a tool parameter of the component at at least one selected position in the drillstring using a trained artificial neural network and information from at least one sensor in the drillstring at a measurement position offset from the selected position; and using the estimated value to evaluate the condition of the component.

One characteristic of the component's condition is an estimated remaining useful life of the component. Knowing when drillstring tools, or their components, approach the end of their useful life is important for planning, maintenance and reliability. For example, estimated remaining useful life may be used to evaluate component failure so the component may be removed from use in the field for repair, reconditioning, or replacement prior to failure. Failure in the field is detrimental, because, among other things, replacement during drilling operations is costly and time-consuming.

Accurate evaluation of a component's condition is problematic for variety of reasons. For example, drillstring tools are multi-component electrical and mechanical systems; tool systems are subjected to vibration and thermal environments; the vibration and thermal history may vary along the length of a tool so that different tools and components see different environments in any one run; the tool's responses to the environment may be measured at only a few points (and sometimes a single point) in the system; and components may be changed during the life of the tool making tracking of the environmental history of a component difficult.

Previous techniques for estimating a condition of a tool employ placing and measuring sensors at a particular location within the tool. Thus, the response at a particular location of a particular component, to the environment, may be determined by placing a sensor at the component. For example, a measurement package (e.g., accelerometers, thermocouples, strain gages, etc.) may be added to each component of the system. However, sensors in the drillstring may be costly and prone to error or mechanical failure; and failure of a sensor may inhibit or preclude further tracking of the tool for the duration of the current operation. Moreover, selecting the correct position on the component to place the sensor may be problematic. Such sensors also take up valuable space in the drillstring, increase demands on power and transmission circuitry, and increase the complexity of tool design.

General embodiments of the present disclosure include methods, devices, and systems for evaluating a condition of a component of a drillstring in a borehole intersecting an earth formation. These embodiments may be directed to utilizing artificial neural networks ('ANNs') trained to quickly and efficiently use downhole sensor information to estimate tool parameters (e.g., vibration, loads, temperature, shock, bending, torque, etc.) at any point in the BHA, including points remote from a sensor; and using the estimated tool parameters to evaluate the condition of the component. The ANN may extrapolate tool parameter values away from the sensor from tool parameter values at the sensor.

Aspects of the disclosure are related to tracking one or more estimated tool parameters during the course of a run, and may include creating a tool parameter history of components at cross sections of the drillstring (or of one or more components thereof) at intervals along the length of the drillstring (or component(s)). The tool parameter history represents in quantitative terms the cumulative estimated tool parameters (e.g., vibration, mechanical load, thermal load, shock, bending, torque, etc.) experienced at each location within the drillstring while it is operating in the borehole. Use of the ANN enables practical calculation of selected tool parameters at each point along the BHA. The tool parameter history can then be compared against component life databases, which may be tailored to each component in the system. Aspects of the disclosure include making component life management decisions using the tool parameter history and the component life databases.

Methods may include estimating a value of a tool parameter of the component at at least one selected position on the drillstring, wherein the estimating is done using a trained artificial neural network that receives information from at least one sensor that is positionally offset from the selected position; and using the estimated value to evaluate the condition of the component. The method may include creating a record of estimated values of the tool parameter at the at least one selected position over time. Values may be estimated for a plurality of positions, such as, for example, a cross section of the component at a plurality of axial locations axially offset from the measurement position on the drillstring. The axial locations may be selected to occur at regular intervals or at specific locations.

In some implementations, the above embodiments may be used as part of a drilling system. FIG. 1 shows a schematic diagram of an example drilling system in accordance with embodiments of the present disclosure for evaluating a condition of a component of a drillstring. FIG. 1 shows a drillstring (drilling assembly) 120 that includes a bottomhole assembly (BHA) 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drillstring 190, attached at its bottom end extends from the surface to the bottom 151 of the borehole 126. A drillbit 150, attached to drillstring 190, disintegrates the geological formations when it is rotated to drill the borehole 126. The drillstring 120 is coupled to a drawworks 130 via a Kelly joint 121, swivel 128 and line 129 through a pulley. Drawworks 130 is operated to control the weight on bit ("WOB"). The drillstring 120 may be rotated by a top drive (not shown) instead of by the prime mover and the rotary table 114. Alternatively, a coiled-tubing may be used as the tubing 122. A tubing injector 114a may be used to convey the coiled-tubing having the drillstring attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drillstring 120 by a mud pump 134. The drilling fluid 131 passes from the mud pump 134 into the drillstring 120 via a desurger 136 and the fluid line 138. The drilling fluid 131a from the drilling tubular discharges at the borehole bottom 151 through openings in the drillbit 150. The returning drilling fluid 131b circulates uphole through the annular space 127 between the drillstring 120 and the borehole 126 and returns to the mud pit 132 via a return line 135 and drill cutting screen 185 that removes the drill cuttings 186 from the returning drilling fluid 131b. A sensor S1 in line 138 provides information about the fluid flow rate. A surface torque sensor S2 and a sensor S3 associated with the drillstring 120 may respectively provide information about the torque and the rotational speed of the drillstring 120. Tubing injection speed is determined from the sensor S5, while the sensor S6 provides the hook load of the drillstring 120.

In some applications, the drillbit 150 is rotated by only rotating the drill pipe 122. However, in many other applications, a downhole motor 155 (mud motor) disposed in the drillstring 190 also rotates the drillbit 150. The rate of penetration (ROP) for a given BHA largely depends on the WOB or the thrust force on the drillbit 150 and its rotational speed.

The mud motor 155 is coupled to the drillbit 150 via a drive shaft disposed in a bearing assembly 157. The mud motor 155 rotates the drillbit 150 when the drilling fluid 131 passes through the mud motor 155 under pressure. The bearing assembly 157, in one aspect, supports the radial and axial forces of the drillbit 150, the down-thrust of the mud motor 155 and the reactive upward loading from the applied weight-on-bit.

A surface control unit or controller 140 receives signals from the downhole sensors and devices via a sensor 143 placed in the fluid line 138 and signals from sensors S1-S6 and other sensors used in the system 100 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165. The BHA 190 may further include other sensors and devices 159 for determining one or more properties of the BHA 190 generally (such as vibration, acceleration, oscillations, whirl, stick-slip, etc.) and general drilling operating parameters (such as weight-on-bit, fluid flow rate, pressure, temperature, rate of penetration, azimuth, tool face, drillbit rotation, etc.) For convenience, all such sensors are denoted by numeral 159.

The BHA 190 may include a steering apparatus or tool 158 for steering the drillbit 150 along a desired drilling path. In one aspect, the steering apparatus may include a steering unit 160, having a number of force application members 161a-161n, wherein the steering unit is at partially integrated into the drilling motor. In another embodiment the steering apparatus may include a steering unit 158 having a bent sub and a first steering device 158a to orient the bent sub in the wellbore and the second steering device 158b to maintain the bent sub along a selected drilling direction.

The drilling system 100 may include sensors, circuitry and processing software and algorithms for providing information about desired dynamic drilling parameters relating to the BHA, drillstring, the drillbit and downhole equipment such as a drilling motor, steering unit, thrusters, etc. Exemplary sensors include, but are not limited to drillbit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, bit bounce, axial thrust, friction, backward rotation, and radial thrust. Sensors distributed on the drillstring may measure physical characteristic parameters such as drillstring acceleration, internal pressures in the drillstring bore, external pressure in the annulus, vibration, temperature, electrical and magnetic field intensities inside the drillstring, bore of the drillstring, etc. Suitable systems for making dynamic downhole measurements include COPILOT, a downhole measurement system, manufactured by BAKER HUGHES INCORPORATED. Any or all of these sensors may be used in carrying out the methods of the present disclosure.

The drilling system 100 can include one or more downhole processors at a suitable location such as 193 on the BHA 190. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Some of these media may also be used for data storage on the BHA. Other equipment such as power and data buses, power supplies, and the like will be apparent to one skilled in the art. In one embodiment, the MWD system utilizes mud pulse telemetry to communicate data from a downhole location to the surface while drilling operations take place. Other embodiments could include wired pipe telemetry, wire telemetry in coiled tubing, electro-magnetic telemetry, acoustic telemetry, and so on. The surface processor 142 can process the surface measured data, along with the data transmitted from the downhole processor, to evaluate a condition of drillstring components. While a drillstring 120 is shown as a conveyance system for sensors 165, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 100 may include a bottomhole assembly and/or sensors and equipment for implementation of embodiments of the present disclosure. While a drillstring is shown for convenience, it should be understood that embodiments of the present disclosure may be used in connection with tools conveyed via any type of rigid (e.g. jointed tubular or coiled tubing) conveyance system. A point of novelty of the system illustrated in FIG. 1 is that the surface processor 142 and/or the downhole processor 193 are configured to perform certain methods (discussed below) that are not in the prior art.

Figure 2:
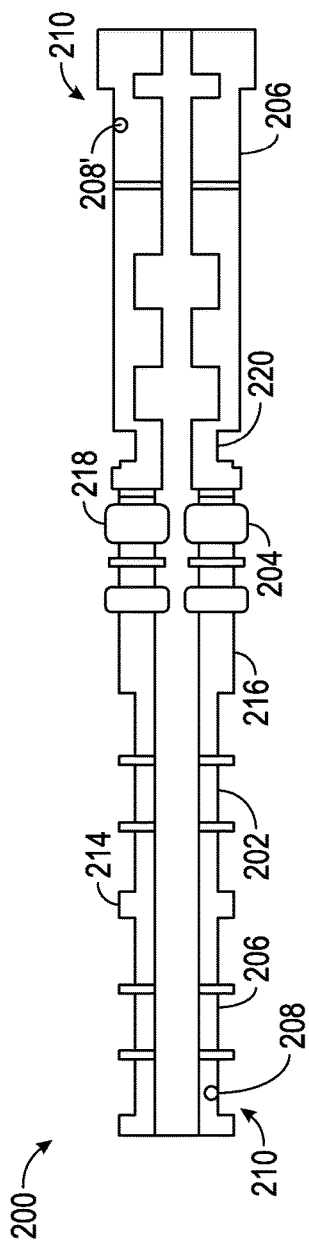
FIG. 2 shows an example configuration of a BHA, which is a component of the drillstring which may be evaluated in accordance with embodiments of the present disclosure.

FIG. 2 shows an example configuration of a BHA, which is a component of the drillstring which may be evaluated in accordance with embodiments of the present disclosure. BHA 200 is also made of up further components 202, 204, 206, which may be evaluated individually or in combination. Each component may have specific dimensions, such as a specific length and particular inside and outside dimensions. The material properties of different BHA components are generally known from technical data and/or or tests performed on the materials used. Generally, the parameters of the BHA and its components are physical in nature and may be predetermined. Tool parameters may be modeled using these properties of the components, either separately or collectively. Each component may also be tracked individually or collectively, as described in greater detail below with reference to FIGS. 7A-7D.

BHA 200 includes sensors 210 and optional sensor 210' responsive to at least one tool parameter at positions 208 and 208', respectively, on BHA 200. The tool parameter may include vibration, temperature, and so on as described above.

Aspects of the disclosure utilize neural network models for estimating one or more tool parameters at selected positions 212-220 using information from downhole sensors remote from the selected positions during drilling operations in the wellbore. The sensor is responsive at least to the same tool parameter being estimated. In one aspect, an artificial neural network model is created or trained using data from controlled or uncontrolled tests. In other aspects, the results obtained from a known (preexisting) simulation or engineering model may be used. Initial simulation of the tool parameter may be carried out using known simulation or modeling software ('standard software') and models of the tool and its characteristics or behavior (e.g., transfer functions, etc.). For example, models may be generated using information available from testing, such as field tests or tests in a laboratory environment (e.g., on a test bench). Development of the model and simulation of the tool parameter may be carried out at the surface using an appropriate hardware environment including one or more computer processors.

Due to the complexity of the calculations required, computing tool parameters using standard software generally requires an inordinately long time, and such operations are extremely processing-power intensive. Thus, simulation of tool parameters throughout the tool body using these methods is unsuitable for practical implementation in the field.

The neural network model may be stored in a suitable computer-readable medium accessible to a processor (such as surface processor 142 and/or downhole processor 193, or a remote processor) during or after drilling operations. The values estimated using the neural network model may be utilized to take one or more actions regarding the component, such as taking the component out of service, performing maintenance, or performing further evaluation.

Figure 3:
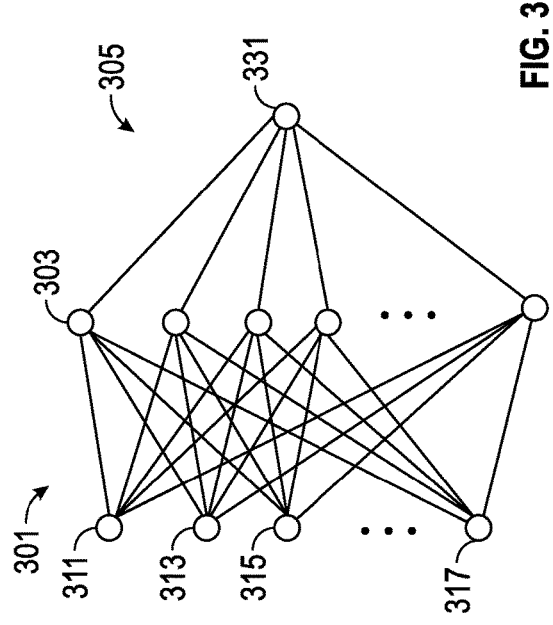
FIG. 3 illustrates an artificial neural network model for use with drilling assemblies in accordance with embodiments of the present disclosure.

FIG. 3 illustrates an artificial neural network model for use with drilling assemblies in accordance with embodiments of the present disclosure. FIG. 3 illustrates artificial neural network 300 having a single hidden layer 303. The input layer 301 includes a number of processors depicted by 311, 313, 315 and 317. The input to the input layer may include information correlated to the tool parameter to be estimated (e.g., rotational vibration, axial vibration, transverse vibration, temperature, and so on). In some examples, this information is related only to measurements (actual or simulated) of values of the same tool parameter at one or more sensors, such as, for example, representative of measurements or a function of measurements. For example, if the tool parameter is rotational vibration, the input may be rotational vibration values at sensor 110. If the tool parameter is temperature, the input may be temperature values at sensors 110 and 110'. In other cases, the information is also related to other tool, borehole, or formation parameters. Thus, in addition to the tool parameter to be estimated, input may include other tool parameters (e.g., bending moment), borehole characteristics (e.g., borehole size), tool characteristics (e.g., bit size), lithology parameters, and so on. The list is not intended to be exhaustive. The hidden layer 303 includes a plurality of processors and the output layer in this example has a single processor. Other embodiments may include a plurality of hidden layers.

In the example shown, the processor of the output layer 305 provides a weighted combination of the outputs of each of the outputs of the processors of the hidden layer 305. The output of each of the processors in hidden layer 305 is a weighted combination of each of the outputs of the processors 311, 313, 315 . . . 317 of the input layer.

The ANN may be trained by providing a set of input values (i.e., a sample) to the input layer. The output 331 of the output layer 305 is compared to the "correct" value of the tool parameter at the selected position corresponding to the set of input values for the sample. The "correct value" may be defined as the value generated from conventional techniques which are understood to be sufficiently similar to the value that would be determined from sensor measurements (or, alternatively, to the true value) in conditions corresponding to the input set, and may be obtained from measurement, simulated using standard software, and so on. In the training phase, this is done for a set of samples called the "training set" and the weights at each of the processors is adjusted to improve a match between the outputs 331 and the correct value for each set of input values in the training set. The training process may be terminated when convergence is reached. Convergence may be determined when the incremental change in the weights is very small, or after a given number of samples have been processed.

Following the training phase, the weights are kept fixed and a plurality of samples called the "test set" may be processed using the trained ANN with the fixed weights. If good agreement is noted between evaluated and actual tool parameters in the test set, then the ANN is considered to be trained, and the ANN is installed in the processor of the BHA or data processing system on the surface for use during drilling operations, or on another remote processor. If good agreement is not noted in the test set between the ANN output and the actual tool parameters, then further training is carried out. For aspects of ANN design, including training, tradeoffs may exist between accuracy of results, scope of application, and speed of calculation. Specific implementations may be designed according to specific applications in specific contexts.

During drilling operations in the borehole, information is acquired from at least one sensor at a measurement position offset from the position selected for estimation. In some examples, this information is related only to measurements of values of the same tool parameter at the at least one sensor, such as, for example, representative of measurements or a function of measurements. Tool parameter information is acquired during drilling operations while other information used may be acquired before drilling from knowledge of the subsurface or from previously drilled boreholes.

Figure 4:
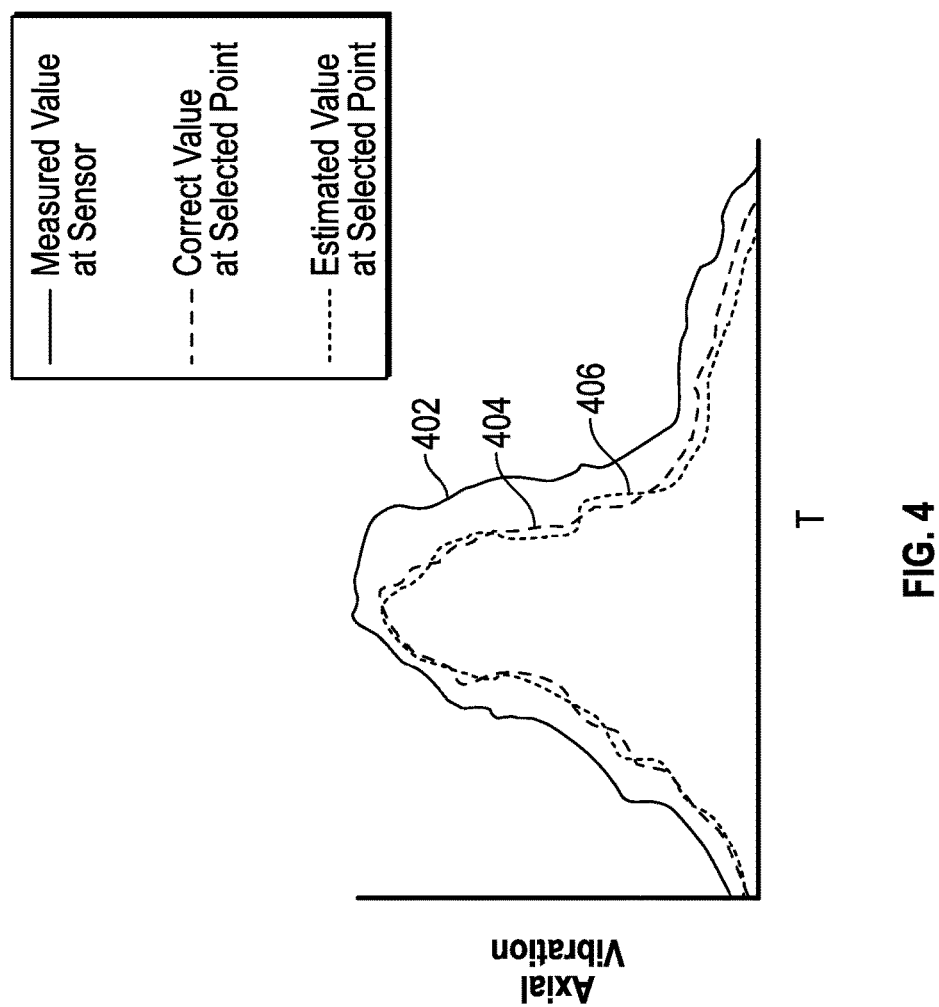
FIG. 4 illustrates a tool parameter of the drillstring with respect to time determined in accordance with embodiments of the present disclosure.

FIG. 4 illustrates a simulated tool parameter (axial vibration) of the drillstring with respect to time determined in accordance with embodiments of the present disclosure. Curve 402 illustrates values of axial vibration of the drillstring at a sensor location 208. Curve 404 illustrates correct values of axial vibration of a selected point 218 of a component as determined according to methods described above. Curve 406 illustrates values of axial vibration of a selected point 218 of a component as estimated using a trained artificial neural network in accordance with embodiments of the present disclosure. Simulated curves 404 and 406 depict that the estimated tool parameter values and the correct tool parameter values are in good agreement. Although FIG. 4 illustrates the estimated value at a single point, the selected position may include a plurality of positions making up a circumference, an annular region, a cross-section, or any other area or a volume of interest of the component, up to and including the entire component. In specific embodiments, a cross section of one or more components may be taken at specific axial locations on the drillstring, such as, for example, at locations corresponding to positions 212-220; at regular intervals along the length of a component, a BHA, or a drillstring; substantially continuously along the length of a component, a BHA, or a drillstring.

Figure 5A:
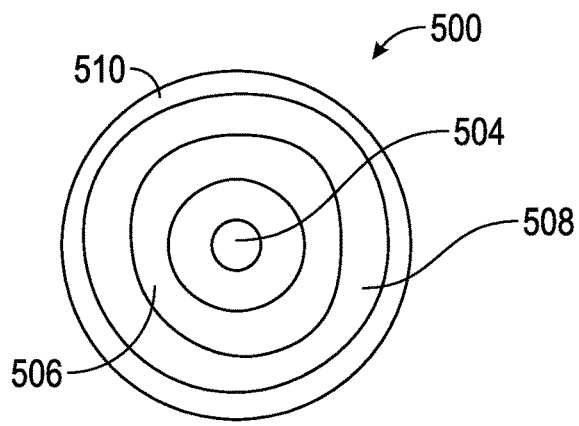
FIGS. 5A-5C illustrate a graphical representation of a tool parameter cross section of a component at a location on a drillstring in accordance with embodiments of the present disclosure.
Figure 5B:
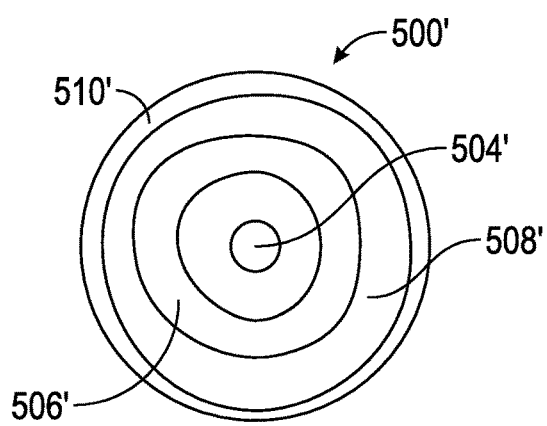
Figure 5C:
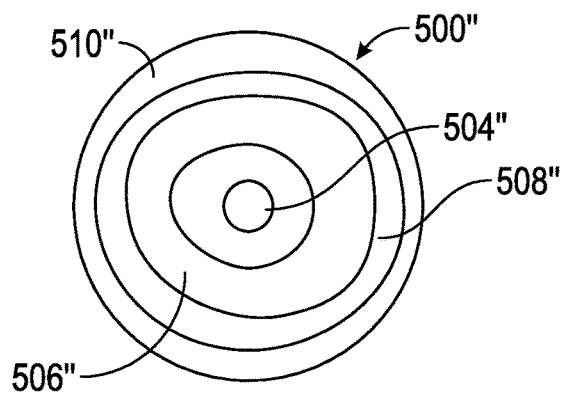

FIGS. 5A-5C illustrate a graphical representation of a tool parameter cross section of a component at a location on a drillstring in accordance with embodiments of the present disclosure. The cross sections may be at a selected axial location on the drillstring. Cross sections 500, 500', 500" each comprise a plurality of estimated values of a tool parameter (temperature) at a corresponding time during drilling operations. For example, FIG. 5B may illustrate a cross section 500' of values at a time after cross section 500 of FIG. 5A; and FIG. 5C may illustrate a cross section 500" of values at a time after cross section 500' of FIG. 5B. As illustrated, the values are determined and assembled into cross sections at regular intervals of time (e.g., 0.5 seconds). In some embodiments, time intervals between cross sections may also be irregular or event-based, or values in the cross section may be updated piecewise.

These values are displayed for convenience as one of a group of value windows, represented by a specific color or pattern. For example, area 508 represents portions of the component at a temperature of greater than 200 degrees Celsius, area 506 represents portions of the component at a temperature of between 180 and 200 degrees Celsius, and area 404 represents portions of the component at a temperature of between 150 and 180 degrees Celsius. Actual values may be tracked using any desired granularity (e.g., 1 millimeter).

Figure 6:
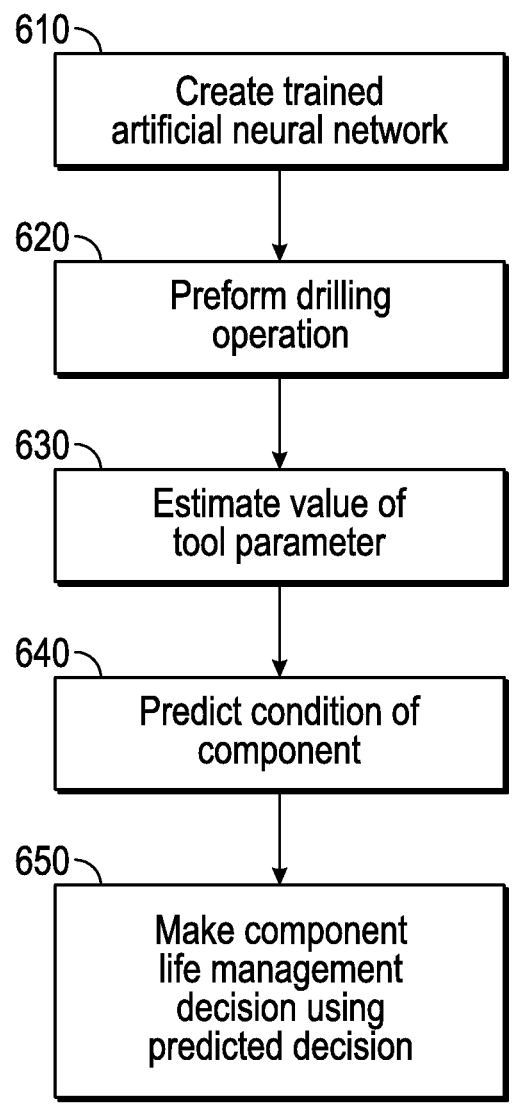
FIG. 6 is a flow chart illustrating methods for evaluating a condition of a component in accordance with embodiments of the present disclosure.

FIG. 6 is a flow chart illustrating methods for evaluating a condition of a component in accordance with embodiments of the present disclosure. Optional step 610 of the method 600 may include creating a trained artificial neural network, as described in further detail above. Optional step 620 of the method 600 may include performing a drilling operation in a borehole. For example, a drillstring including a component and at least one sensor responsive to a tool parameter may be used to form (e.g., drill) the borehole.

Step 630 of the method 600 may include estimating a value of a tool parameter of the component at at least one selected position on the drillstring using the trained artificial neural network and information from at least one sensor at a measurement position offset from the selected position. Step 630 may be carried out repetitively (e.g., periodically) during drilling. For example, step 630 may be carried out while the drillstring is in the borehole, e.g., including near real-time, on a single trip into or out of a borehole; or after drilling has been completed. For the near real-time example, the value of a tool parameter at each location may be estimated at each time step (e.g., at intervals of approximately 1 millisecond, 0.1 seconds, 1 second, etc.).

Step 640 may include using the estimated value to evaluate the condition of the downhole component. Step 640 may be carried out at the surface (e.g., by sending relevant information to the surface), downhole, or divided between downhole and the surface. Component conditions may include: maintenance is needed, end of useful life is approaching, failure is imminent, and so on. Step 640 may include tracking estimated values of the tool parameter in the borehole over time. Estimated values may be stored as a record representing a tool parameter history of one or more components. For example, the cumulative value of the tool parameter at each location over time may be used to estimate the condition of the downhole component. The tool parameter history of a component may be associated with the component (or "tagged" to the component) using component tracking system software.

The record may be implemented as a data structure (e.g., arrays or database records) in computer memory or information storage, such, for example, storage device 144 at the surface or similar downhole information storage in the drillstring. Information storage may include an information storage medium including any computer information storage device, such as, but not limited to, a ROM, USB drive, memory stick, hard disk, removable RAM, EPROMs, EAROMs, EEPROM, flash memories, optical disks, network based storage, or any other commonly used memory storage system known to one of ordinary skill in the art (including Internet based storage), or combinations thereof.

In one example, the information may be stored as a log file, which may be a recording of the operations involving the component or the drillstring. The information may be recorded chronologically, and may be located in a memory, in a root directory in a predetermined memory address and data format. The log file may reflect the tool parameter history at every moment during its deployment and/or its historical utilization. In various embodiments, incorporation of information from the estimated values of a particular measurement cycle into the tool parameter history may be carried out using one or more of the following methodologies: the information from each measurement cycle of the estimated values may be stored for later retrieval, a particular number of past measurement cycles may be stored in first-in-first-out rotation, measurement cycles may be stored at intervals, information from measurement cycles may be used to update a running history or otherwise aggregated and then (possibly) discarded, estimated values from a particular measurement cycle may be stored only when meeting one or more filtering criteria, and so on.

Step 640 may be carried out by evaluating the tool parameter history. For example, step 640 may include comparing records of a tool parameter history for the component against one or more component life databases, which may be implemented as a lookup table. The component condition may be determined using the tool parameter history and the component life databases. Step 640 may include determining an estimated remaining useful life of the component.

Step 650 may include making a component life management decision using the evaluated condition. For example, the component may be left in service, removed from use in the field for repair, reconditioning, or replacement; subjected to further testing, and so on. Step 650 may include notifications via email, text, or indications within a proprietary system, such as a surface drilling control system or well planning software application.

FIG. 7A illustrates an example record in accordance with embodiments of the present disclosure. Record 700 includes information relating to tool parameters for a particular component, "Component X," of a type (e.g., model number, production series, etc.) "Component Type Y." Record 700 includes the start and end times (e.g., universal time stamps) for any periods for which a selected threshold for a selected tool parameter ("tool parameter threshold") is exceeded. The timestamp may be determined from global positioning systems or other tool systems. In other embodiments, any parameter change during drilling operations may be logged, e.g., with timestamps. Other records may include cumulative time the component experiences tool parameter values above a tool parameter threshold. Example records may also separately track information for a particular segment or portion of a component. Record 700 may be created using one or more processors downhole and transmitted to (or later retrieved at) the surface, or may be created at the surface from information acquired downhole.

FIG. 7B illustrates a component life database for evaluating conditions and providing a lifetime management action for the condition. The database, implemented as lookup table 701, includes a condition and an action for a component of a particular component type ("Component Type Y") having various combinations of record values relating to tool parameters. Using the lookup table and the tool parameter history for a particular tool of the corresponding component type, the condition and action for the component may be determined.

FIGS. 7C and 7D illustrate further example records in accordance with embodiments of the present disclosure. In FIG. 7C, record 702 includes information relating to tool parameters for a particular component, "Component X," of a type "Component Type Y." Record 702 includes the cumulative values 706 of selected tool parameters ("tool parameter threshold") at positions within the drillstring. As the value of each tool parameter at a selected position is periodically estimated (a measurement cycle), the value is added to the cumulative total maintained in a portion of the record ("record location") corresponding to the tool parameter for the selected position, and the corresponding measurement cycle value 704 is incremented. For example, each time the axial vibration at position 17 is estimated, the estimated value may be added to the cumulative axial vibration value stored in record location $X_{1754}$, and $X_{1753}$ may be incremented. Record 702 corresponds to a system in which some or all of the tool parameter values may be estimated at a different sampling rate. In other embodiments, some or all of the tool parameter values at each of the positions is estimated over the same period, such that $X_1$ may represent the measurement cycle value for each record location. Record 702 may be created using one or more processors downhole and transmitted to (or later retrieved at) the surface, or may be created at the surface from information acquired downhole.

In FIG. 7D, record 712 includes the current values of history parameters 716 related to selected tool parameters 714 ("tool parameter threshold") at positions within the drillstring. At each measurement cycle, the value of each tool parameter at each selected position is periodically estimated (a measurement cycle) and the corresponding history parameter 716 is operated on using the current estimated value. The corresponding history parameter 716 may be an average, a moving average, a standard deviation, or other statistical measure. For example, a moving average of temperature at position 1 may be calculated and stored in $X_1$. Values of previous estimated parameter values may be stored in a buffer for as long as needed to calculate the moving average.

History parameters 716 may be calculated as a function of one or more of the selected tool parameters 714 or may involve more complex methodologies. For example, the cyclical stress parameter may be a cumulative stress indicator, with the cyclical stress for each measurement cycle calculated as a function of a number of revolutions at a bending moment within a particular moment window, wherein the bending moment is calculated from estimated strain values, and then added to the total. Record 712 may be created using one or more processors downhole and transmitted to (or later retrieved at) the surface, or may be created at the surface from information acquired downhole.

The term "conveyance device" as used above means any device, device component, combination of devices, media and/or member that may be used to convey, house, support or otherwise facilitate the use of another device, device component, combination of devices, media and/or member. Exemplary non-limiting conveyance devices include drillstrings of the coiled tube type, of the jointed pipe type and any combination or portion thereof. Other conveyance device examples include casing pipes, wirelines, wire line sondes, slickline sondes, drop shots, downhole subs, BHA's, drillstring inserts, modules, internal housings and substrate portions thereof, self-propelled tractors. The term "information" as used above includes any form of information (analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions.

The term "component" as used above means any device, device component, combination of devices, housings, assemblies, sub-assemblies, modules, members, mandrels, or any other constituent part, such as, for example, electronics, integrated circuits, circuit boards, wires, sensors, couplers, and so on that may be replaceable (alone or as part of an assembly) on a drillstring and used downhole. By "substantially continuously," it is meant at intervals sufficiently small so that granularity of measurement does not appreciably affect the determination of the useful life of the component, examples of such an interval being, for example, smaller than 5 meters, smaller than 1 meter, smaller than 10 centimeters, smaller than 5 centimeters, smaller than 1 centimeter, smaller than 0.1 centimeters, and so on. Offset may refer to a distance between a selected position for estimation of a value of a tool parameter on a component and a measurement position for a sensor measuring a value of the tool parameter at the sensor. The offset may be a distance along the longitudinal axis of the tool. As a result of offset, the sensor may not be on the component for which the tool parameter value is estimated.

The term "tool parameter" as used herein means a characteristic of a state of a downhole component as it is being used in drilling operations downhole, and for which values may be different along the length of the drillstring. Example tool parameters may include, for example, acceleration, vibration, whirl, radial displacement, stick-slip, torque, shock, vibration, friction, radial thrust, drillstring acceleration, internal pressures in the drillstring bore, external pressure in the annulus, vibration, temperature, electrical and magnetic field intensities inside the drillstring, a bore of the drillstring, and so on. The term "physical characteristic parameter" as used herein means a tool parameter for which accurate measurement may only occur at a measurement position, and which thereby excludes RPM, depth, weight on bit, ROP, and other drilling parameters. The term "measurement position" as used above means the position of the component at which the sensor measures the effects of current conditions on the tool parameter value of the component. The term "regular intervals" as used above means at intervals of at least approximately the same spacing.

In some embodiments, estimation of the condition of the component may involve applying a model. The model may include, but is not limited to, (i) a mathematical equation, (ii) an algorithm, (iii) a database of associated parameters, (iv) an array, or a combination thereof which describes physical characteristics of the borehole.

While the present disclosure is discussed in the context of a hydrocarbon producing well, it should be understood that the present disclosure may be used in any borehole environment (e.g., a water or geothermal well). It should be noted that the terms wellbore and borehole are used interchangeably.

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

We claim:

1. A method for evaluating a condition of a downhole component of a drillstring, the method comprising:
    estimating a plurality of values of a tool parameter of the component comprising at least a first value at a first selected position on the drillstring and a second value different than the first value at a second selected position on the drillstring different than the first selected position, wherein the estimating is done using a trained artificial neural network that receives information from at least one sensor responsive to the parameter, wherein each sensor of the at least one sensor is positionally offset from the first selected position and the second selected position and the parameter is estimated without information from a sensor responsive to the parameter at the first selected position and the second selected position;
    using at least one of the estimated plurality of values to evaluate the condition of the downhole component, wherein the condition is indicative of a likelihood of failure of the component; and
    making a component life management decision about the component using the condition comprising at least removing the component from service.

2. The method of claim 1 further comprising creating a record representing information from estimated values of the tool parameter at the at least one selected position over time.

3. The method of claim 1 wherein the plurality of positions comprises a plurality of positions at intervals along the component.

4. The method of claim 1 wherein the plurality of positions comprises a plurality of positions substantially continuously along the component.

5. The method of claim 1 wherein the at least one sensor is positionally offset from the selected position by at least half of the axial length of the component.

6. The method of claim 1, wherein the information received from the at least one sensor is at least one other value of the tool parameter measured at the at least one sensor.

7. The method of claim 1, wherein the tool parameter comprises a characteristic of a state of a downhole component as it is being used in drilling operations downhole.

8. The method of claim 1 wherein the tool parameter comprises at least one parameter selected from the group comprising: i) a vibration parameter; and ii) a temperature parameter.

9. The method of claim 1, wherein the condition is at least one of: i) material fatigue of the component; and ii) estimated remaining useful life of the component.

10. The method of claim 1 wherein the tool parameter comprises component temperature.

11. A system for evaluating a condition of a downhole component of a drillstring in a borehole using at least one sensor on the drillstring, the system comprising:
    at least one processor configured to:
        estimate a plurality of values of a tool parameter of the component comprising at least a first value a first selected position on the drillstring and a second value of the tool parameter different than the first value at a second selected position on the drillstring different than the first selected position, wherein the estimating is done using a trained artificial neural network that receives information from at least one sensor responsive to the parameter, wherein each sensor of the at least one sensor is positionally offset from the first selected position and the second selected position and the parameter is estimated without information from a sensor responsive to the parameter at the first selected position and the second selected position
        use at least one of the estimated plurality of values to evaluate the condition of the downhole component, wherein the condition is indicative of a likelihood of failure of the component; and
        making a component life management decision about the component using the condition comprising at least removing the component from service.

12. The system of claim 11, further comprising a drillstring configured to be conveyed into a borehole, the drillstring comprising the downhole component.

13. The system of claim 11, further comprising a computer memory accessible to the at least one processor, wherein the at least one processor is further configured to create a record in the computer memory representing estimated values of the tool parameter at the at least one selected position over time.

14. The system of claim 11 wherein the plurality of positions comprises a plurality of positions at intervals along the component.

15. The system of claim 11 wherein the plurality of positions comprises a plurality of positions substantially continuously along the component.

16. The system of claim 11 wherein the at least one sensor is positionally offset from the selected position by at least half of the axial length of the component.

17. The system of claim 11 wherein the information received from the at least one sensor is at least one other value of the tool parameter at the at least one sensor.

18. The apparatus of claim 11 wherein the tool parameter comprises component temperature.

19. A method for evaluating a condition of a downhole component of a drillstring, the method comprising:
- using information from at least one sensor responsive to the parameter to estimate a value of a tool parameter of the component different from an other value of the tool parameter provided by the at least one sensor at at least one selected position on the drillstring, wherein each sensor of the at least one sensor is positionally offset from the selected position and wherein the estimating is done using a trained artificial neural network that receives the information and the parameter is estimated without information from a sensor responsive to the parameter at the at least one selected position;
- using the estimated value to evaluate the condition of the downhole component, wherein the condition is indicative of a likelihood of failure of the component; and
- making a component life management decision about the component using the condition comprising at least removing the component from service.

* * * * *